ROTARY RECORD EQUIPMENT

Filed April 26, 1962 5 Sheets-Sheet 1

INVENTOR.
SAMUEL ASTON LOYD, JR.
BY
Gary, Desmond & Parker
ATTYS.

INVENTOR.
SAMUEL ASTON LOYD, JR.
BY
Gary, Desmond & Parker
ATTYS.

INVENTOR.
SAMUEL ASTON LOYD, JR
BY
Gary, Desmond & Parker
ATTYS.

Feb. 11, 1964 S. A. LOYD, JR 3,120,824

ROTARY RECORD EQUIPMENT

Filed April 26, 1962 5 Sheets-Sheet 4

INVENTOR.
SAMUEL ASTON LOYD, JR.
BY
Gary, Desmond & Parker
ATTYS.

INVENTOR.
SAMUEL ASTON LOYD, JR.
BY
Gary, Desmond & Parker
ATTYS.

United States Patent Office 3,120,824
Patented Feb. 11, 1964

3,120,824

ROTARY RECORD EQUIPMENT

Samuel Aston Loyd, Jr., Waynesboro, Va., assignor to Acme Visible Records, Inc., Crozet, Va., a corporation of Delaware Filed Apr. 26, 1962, Ser. No. 190,377
6 Claims. (Cl. 108—20)

This invention relates to record filing and holding equipment of the rotary type.

More particularly the present invention relates to rotary or rotatable record filing devices, generally in the form of two or more concentric annular platforms mounted for rotation in a horizontal plane whereby the platforms may be rotated by operators seated at one or more fixed positions adjacent to the assembly and whereby the operators at fixed positions may cause the respective record holding platforms to be rotated to the desired position for access to the contents thereof.

It is an object of the present invention to provide a novel, multi-platform rotary record carrying device of a a compact and novel construction and enhanced accessibility and utility.

A further object of the present invention is to provide a motor-operated, multiple platform, rotary record carrying device wherein a plurality of concentric platforms can be selectively rotated about a common axis in a clockwise or counterclockwise direction or held against rotation as desired independently of each other, a characterizing feature being that there need not be a center shaft or a plate, disc or spokes to tie each platform to the center of rotation.

Other objects of the present invention, its details of construction, arrangement of parts, and economies thereof will be apparent from the following specification and accompanying drawings wherein.

Figures 1, 2:
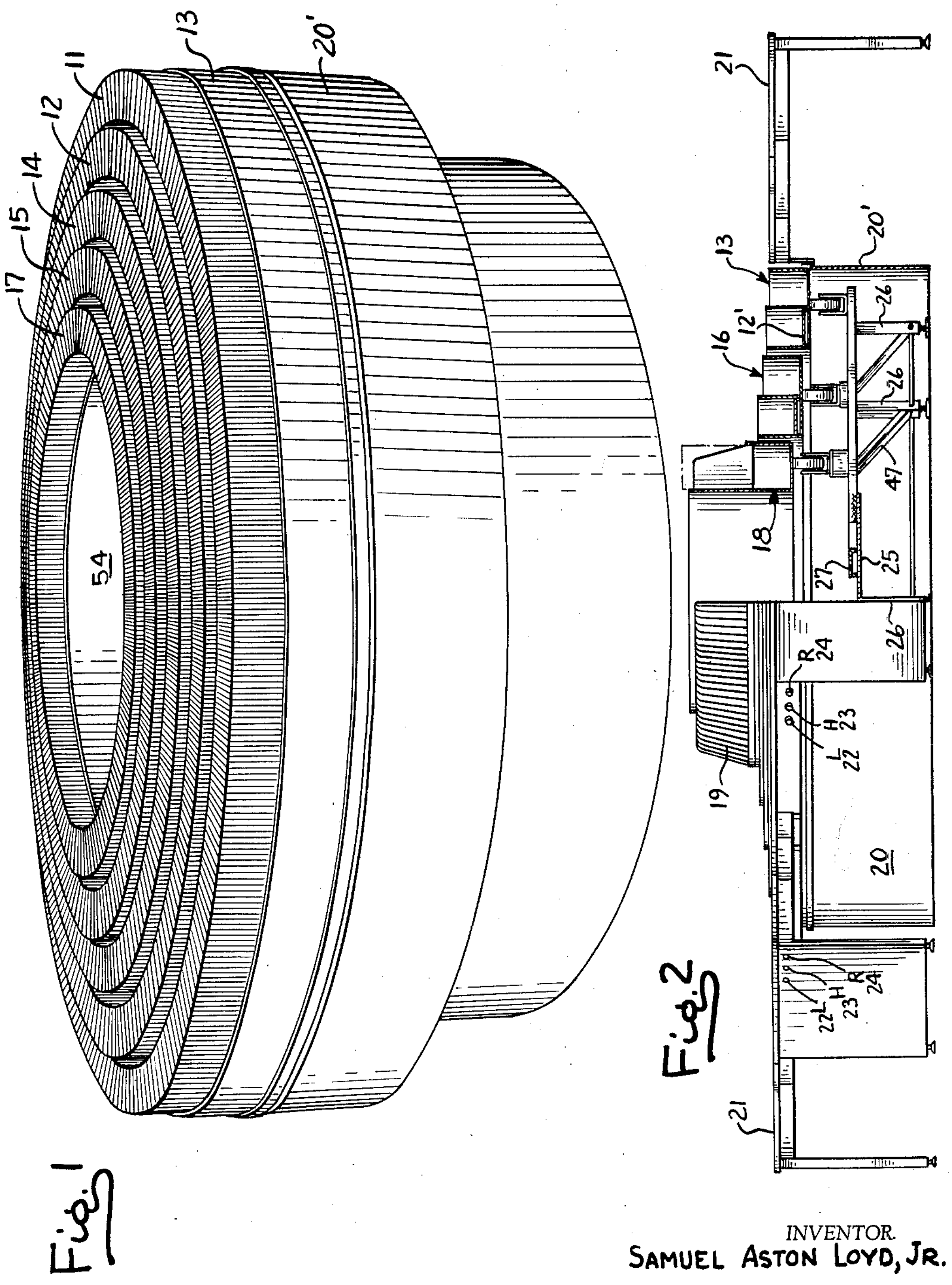
FIG. 1 is a perspective view of apparatus formed in accordance with the present invention.
FIG. 2 is a side elevational view partly in section illustrating a modified form of the assembly of the present invention.

Referring to the drawings, reference numerals 11 and 12 show banks of cards disposed in an annular rotatable platform in the form of a tray generally indicated as 13, and which can be, as shown in FIG. 2, divided to form two annular sections, the inner one of which, holding cards 12 as shown in FIG. 1, can be slightly elevated at the top from the outermost section for visual aid by means of a false bottom 61. Similarly, rows or boxes of record cards 14 and 15 as shown in FIG. 1 can be disposed in the annular tray 16 shown in FIG. 2 and in the two divided components thereof. It will also be understood that the platform 13 may be flat, or in the form of ring supporting vertically and radially extending divider partitions, and the like.

In addition to the rotatable components 13 and 16 being centrally divided so as to define two concentric but unitary trays wherein the inner one is stepped slightly above the outer one in the manner indicated, the innermost units 16 and 18 may be respectively stepped up as a whole above the outermost unit 13 for similar facilitation of visibility, access and utility.

FIG. 1 shows a fifth row of cards 17 disposed in the innermost concentric annular tray or holder 18. FIG. 2 illustrates the innermost tray 18 to have disposed thereabove a modified form of record card holder which extends above the tray 18 and is formed with vertically disposed radially extending dividers 19 for holding record cards or books which may be correlated to the material in the remaining annular trays 13 and 16. FIG. 1 shows the supporting base and other operating parts, as will be hereinafter described, embraced by and enclosed in the housing 20.

Figure 3:
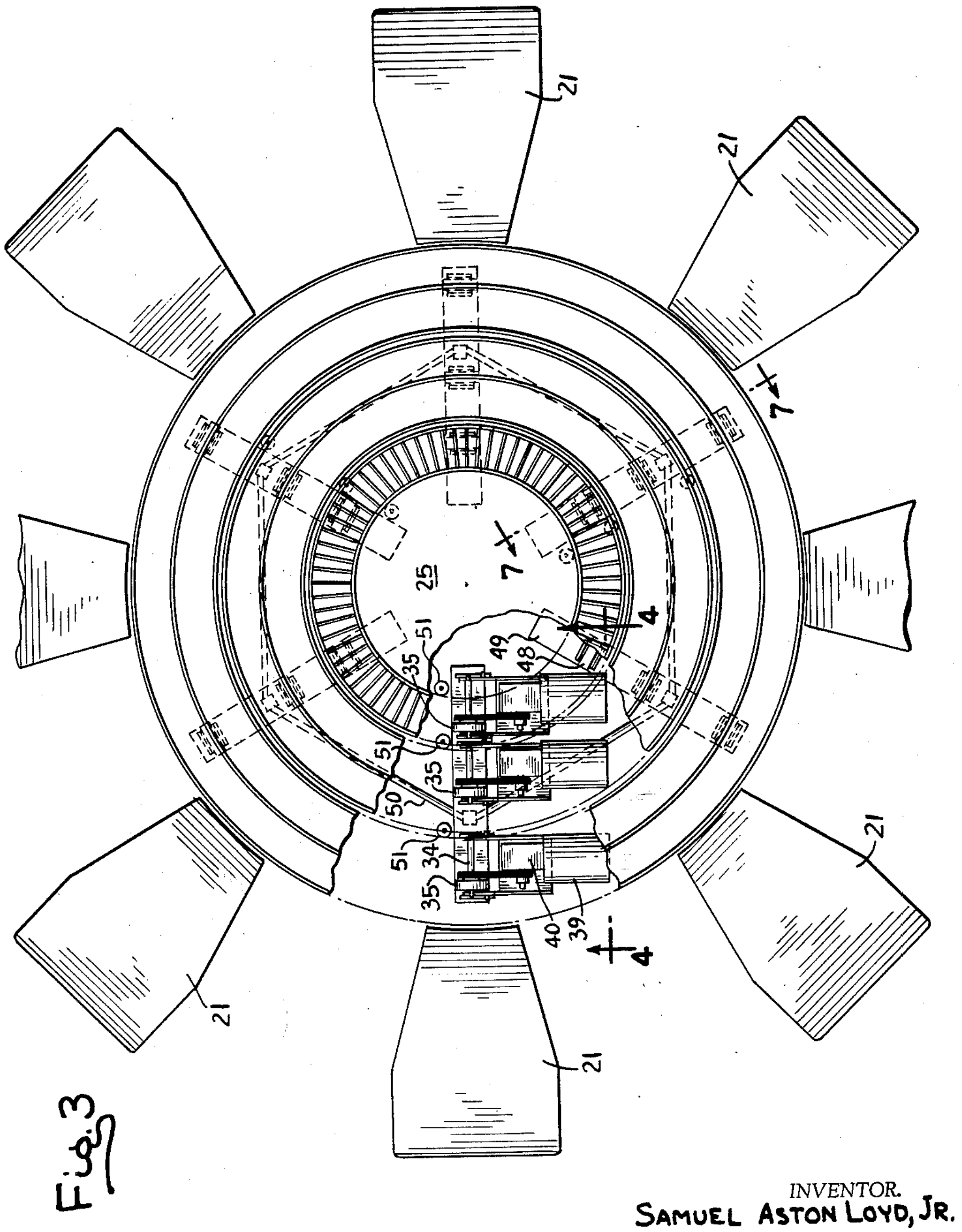
FIG. 3 is a plan view of the form shown in FIG. 2, with parts broken away.

FIGS. 2 and 3 further illustrate disposition about the modified housing 20′ of a plurality of radially extending, suitably angularly spaced, fixed desks or work positions 21 whereby one or more operators may be seated about the housing 20′ for access to the record cards or books and the like disposed in the independently rotatable annular concentric trays 13, 16 and 18. The operators may independently rotate the respective trays either clockwise or counterclockwise or hold them fixed by control buttons such as 22, 23, and 24 respectively indicated as L (Left), H (Hold) and R (Right), disposed at each station or desk as indicated in FIG. 2, and, although not shown, it will be understood that a similar set of control buttons and electrical controls are provided for each rotatable tray. It will also be understood that although three concentric rotatable tray units are shown in the accompanying drawings for the purpose of illustration, a single one, two or more than three rotatable trays, as will be hereinafter described, can be employed.

Figure 4:
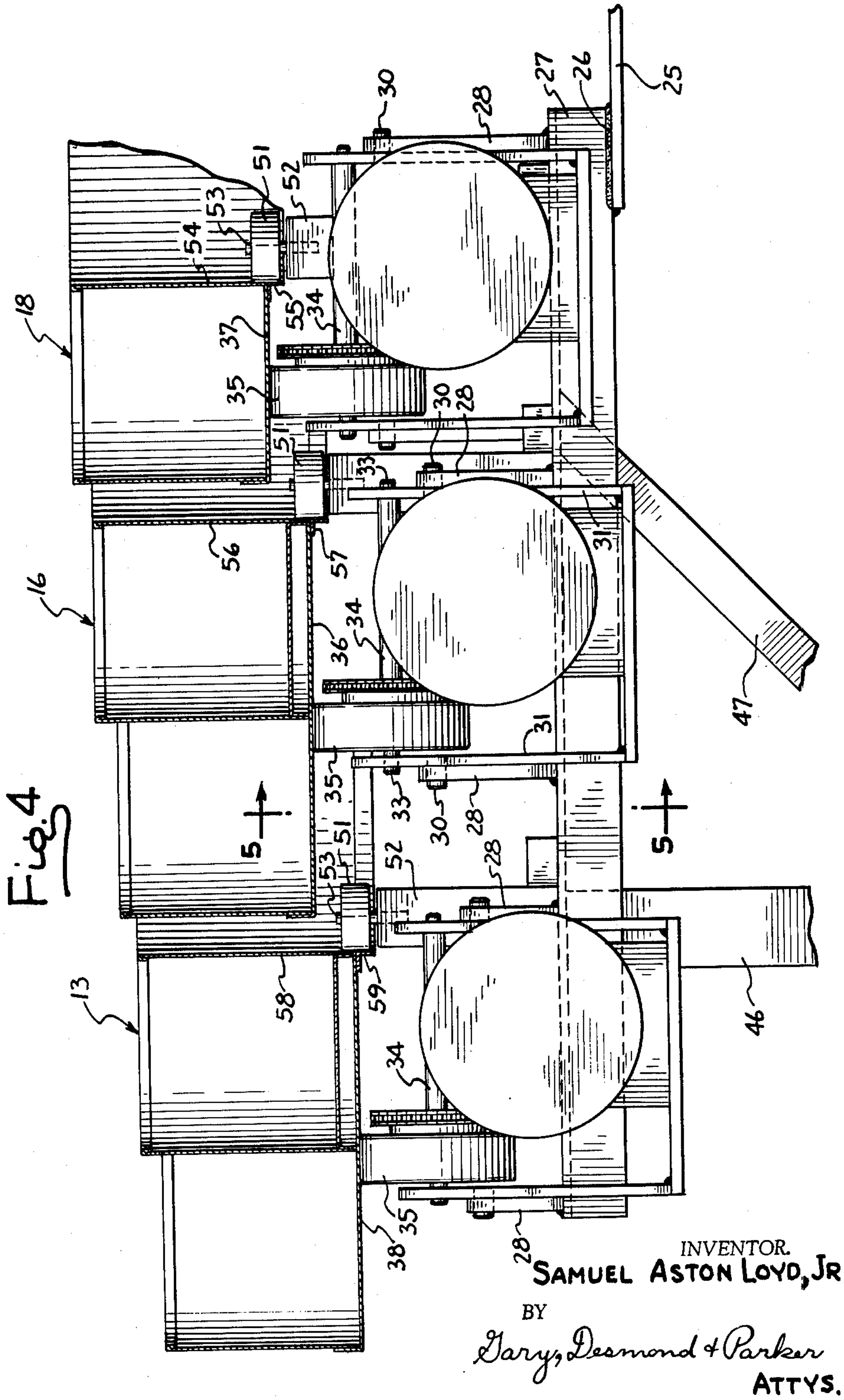
FIG. 4 is an enlarged sectional elevation taken on the line 4—4 of FIG. 3.

Extending radially from the fixed plate component 25 and secured thereto at one end as by welding at 26 is the beam 27. Secured to the beam 27 and below each of the rotatable trays 13, 16 and 18 respectively, as shown in FIG. 4, is a yoke defined by a pair of arms 28, 28 each formed with an upwardly opening slot 29 receiving the pins 30, 30 extending laterally from the arms 31, 31 so that the arms 31, 31 are pivotally supported in the slots 29, 29 of the arms 28, 28. The upper ends of the arms 31, 31 are each also formed with an upwardly opening notch 32 receiving the stub ends 33, 33 of the shaft 34 so that the stub ends 33, 33 are yieldably movable in a substantially vertical direction within the lateral confines of the slots 32. The shaft 34 carries at one end within and adjacent to the yoke arm 31 a supporting driven roller 35 which is yieldably urged against the base 36 of a rotatable tray 16 centrally thereof in a radial direction. Similar driven rollers 35 bear against the base 37 of tray 18, and base 38 of tray 13.

At the lower ends of and between the arms 31, 31 is mounted a motor 39 and associated integral reducing mechanism 40 leading to the output shaft 41 and associated sprocket 42. This motor and associated reducing mechanism is of a type known as a Ratiomotor sold by Boston Gear Works, whose output shaft can rotate in either direction by connection of the motor lead wires in a suitable manner to a reversing switch, not shown but well understood. The operating stations previously indicated control the operation of these motors through suitable relays.

The Ratiomotor assembly unit is suitably secured between the arms 31, 31 on the base plate 43, and the sprocket wheel 35 is driven by means of a sprocket chain 44 extending about the sprocket 42 on the motor output shaft 41 and about a sprocket 45 fixed to shaft 34 adjacent drive wheel 35.

Figures 5, 6, 11:
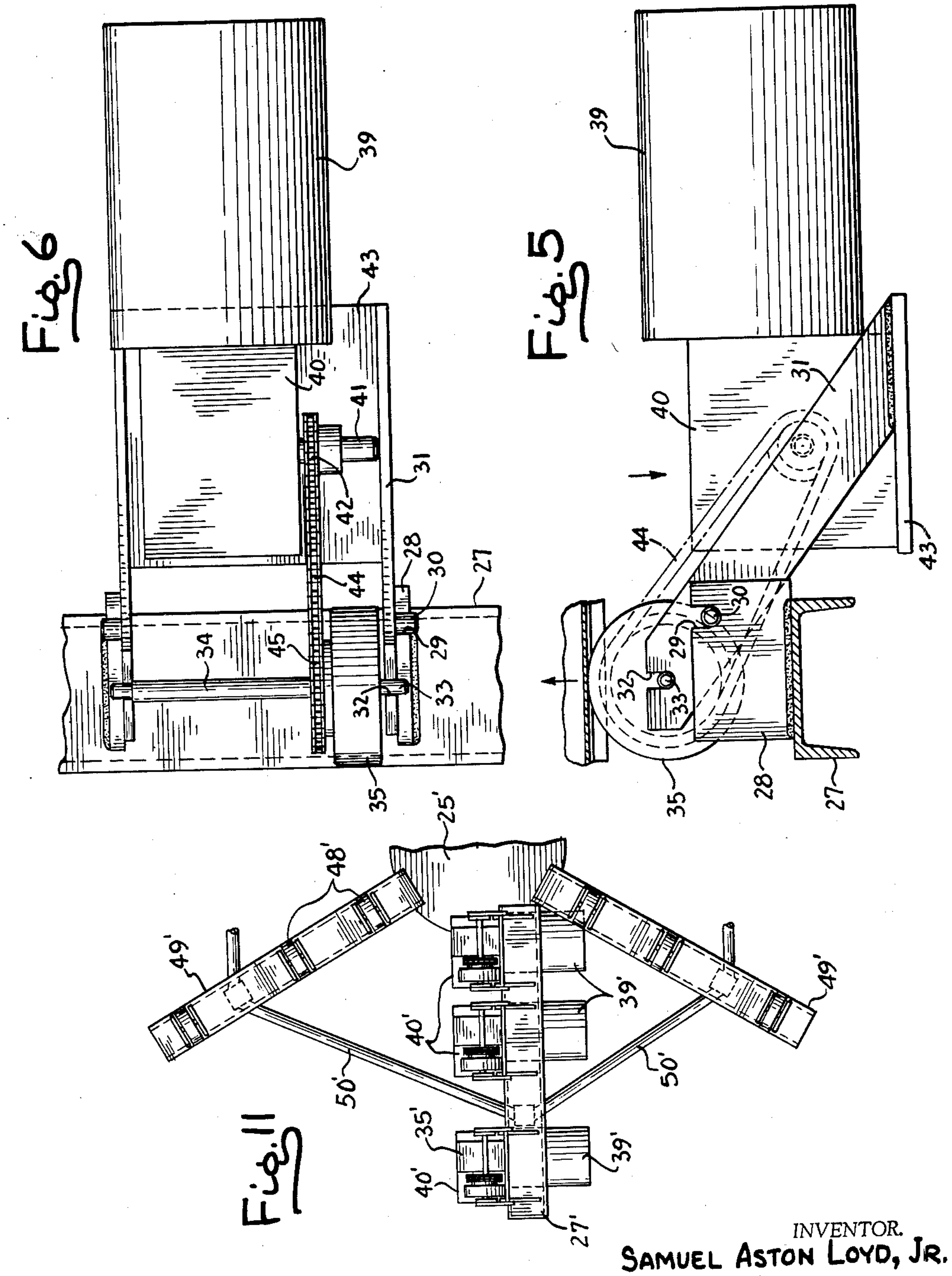
FIG. 5 is a fragmentary sectional view taken on the line 5—5 of FIG. 4.
FIG. 6 is a plan view of the components shown in FIG. 5.
FIG. 11 is a fragmentary plan view of the components of FIGS. 9 and 10.
Figures 7, 8:
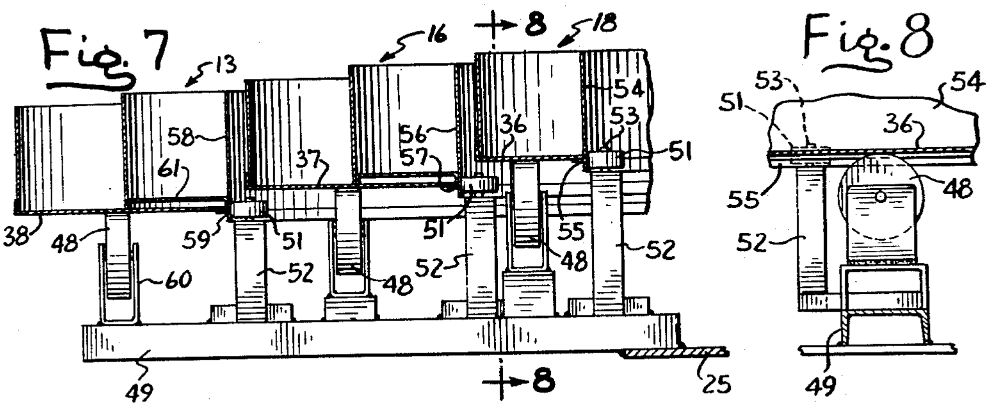
FIG. 7 is an enlarged sectional detailed view taken on line 7—7 of FIG. 3.
FIG. 8 is a fragmentary transverse sectional view taken on the line 8—8 of FIG. 7.

It will be evident that as the arms 31, 31 which support the motor at one end and the drive wheel 35 at the other are pivotally mounted in the yoke arms 28, 28, the heavier load of the motor-speed reducing assembly 39, 40 tends to rotate the arms 31, 31 or move one end in a downward direction as shown by the arrow, and to cause the drive wheel 35 to be yieldably urged upwardly as indicated by the arrow adjacent thereto in FIG. 5, so that the drive wheel 35 is maintained yieldably urged in frictional driving engagement with the base of its associated rotatable tray.

At least one drive wheel 35 is provided for each concentric rotatable tray and more than one may be employed suitably angularly spaced from the assembly carried by the beam 27 shown in detail of FIG. 3. As shown in FIG. 4, the beam 27 may be further supported at its outer end by suitable supporting stand components such as the vertically extending members 46 and brace members 47, as further shown in FIG. 2.

For the purpose of adequate support of the respective rotatable concentric annular trays 13, 16 and 18, there is further provided one or more sets of rollers 48 supported in brackets 60 on radially extending beams 49 and secured at one end to the plate 25 in a manner similar to that described for beam 27. These beams 49 may be tied together to the beam 27 for structural security as by the braces 50 as shown in FIG. 3. The rollers 48 are shown to be merely idler rolls and although five beams 49 are shown in FIG. 3, in addition to the beam 27 carrying the driving rolls 35 a lesser or greater number can be employed, and as previously indicated, more than one set of driving rollers may be employed on spaced beams in each circular series. It will be understood that the beams 27 and 49 are suitably angularly spaced so as to provide proper support for the trays which are disposed thereover.

For locating and retaining each of the trays 13, 16 and 18 in their respective orbits, I provide a circular series of locating rollers disposed for rotation about vertical axes, which comprise two or more or preferably at least three equi-angularly spaced rollers 51 mounted on the vertically extending supports 52 for rotation about the axes 53 and disposed against the inner peripheral wall of a tray, for example, wall 54 of the tray 18 and/or its associated angle iron piece 55 secured to the base 37. A series of rolls 51 are similarly disposed against the inner defining wall 56 and/or angle iron component 57 of tray 16, and a series likewise against the inner peripheral wall 58 and/or angle iron 59 associated with base 38 of tray 13.

As shown in FIG. 3, I provide three equi-angularly spaced locating idler rollers 51 disposed adjacent the inner periphery of each of the concentrically arranged annular rotatable trays although more may be employed. It is likewise for the purpose of illustration and not limitation that FIG. 3 shows one set of driving rollers 35 for each rotatable tray, and a plurality of suitably arranged and balanced sets of idler supporting rollers 48.

Figures 9, 10:
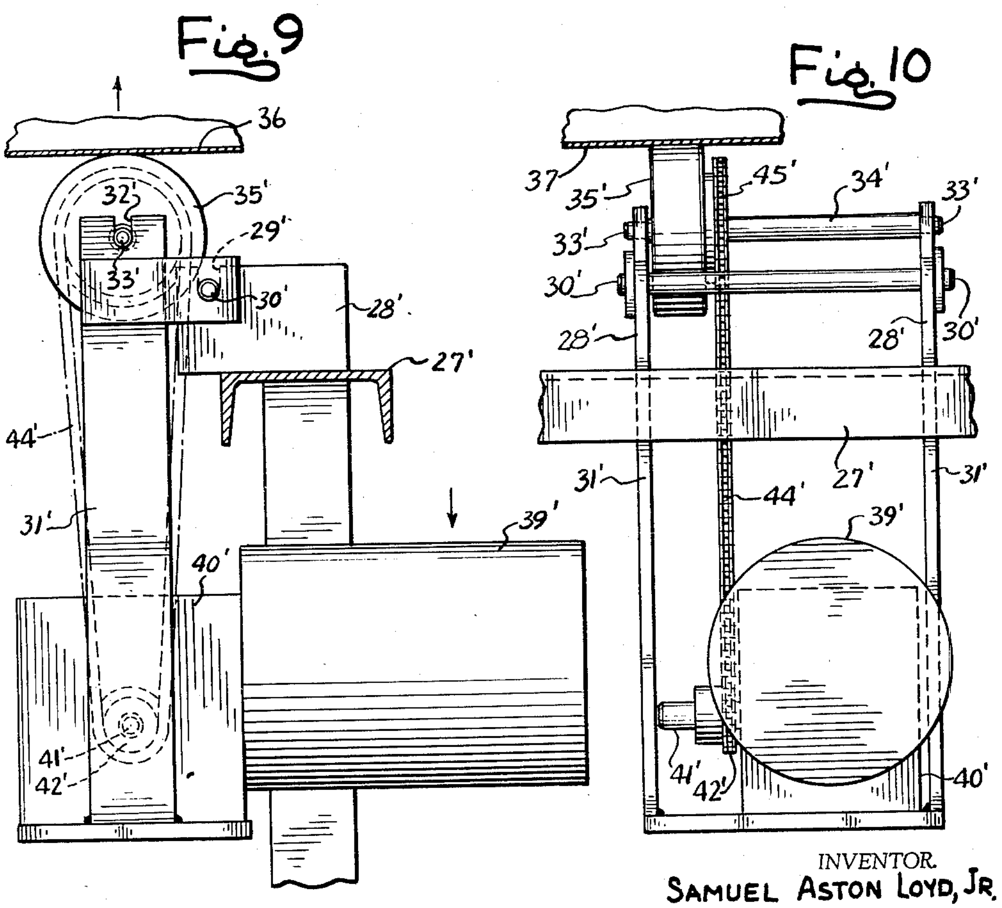
FIG. 9 is a side elevational detailed view of a modified form of construction similar to that shown in FIG. 5.
FIG. 10 is an end view of the components shown in end view in FIG. 9.

FIGS. 9, 10 and 11 illustrate a slightly modified form or arrangement for pivotally suspending the arms which hold the motor and gear reducer assembly at one end and the driving roll at the other, operation and relationship to the assembly as a whole being otherwise the same. Thus, the yoke comprising a pair of arms 28′, 28′ are formed with upwardly opening slots 29′ adjacent one end receiving the pins 30′, 30′ extending laterally from the arms 31′, 31′ so that these arms are pivotally supported in the aforesaid slots. The upper ends of the arms 31′, 31′ are also each formed with an upwardly opening notch 32′ receiving the stub ends 33′, 33′ of shaft 34′ so that the stub ends are yieldably movable in a substantially vertical direction within the lateral confines of the slots in which they are received.

The shaft 34′, similar to the shaft 34, carries at one end a driven roller 35′ which is yieldably urgeable against a rotatable tray in a manner similar to that described previously with respect to driven rolls 35.

At the lower end of and between the arms 31′, 31′ is mounted the motor 39′ and integral reducing gear mechanism 40′ leading to the output shaft 41′ and associated sprocket 42′. In this instance, it will be observed that the motor assembly 39′, 40′ is mounted so that it is substantially at a right angle to the axis of the arms 31′, 31′ as distinguished from the arms 31, 31 being at an incline to the assembly 39, 40 as shown in FIG. 5. This arrangement of FIGS. 9–11 provides a somewhat more compact assembly, but as previously indicated functions in the manner previously described. Thus the roll 35′ is driven by means of the sprocket chain 44′ extending about the sprocket 42′ on the motor output shaft 41′ and about the sprocket 45′ fixed to the shaft 34′ adjacent drive wheel 35′. Thus, as in the previously described form, it will be evident that the drive wheels 35′ are yieldably urged into frictional and driving engagement against the bottoms of the rotatable trays in a manner described with respect to the forms of the previous figures.

Although I have shown and described the preferred embodiments of my invention, it will be understood by those skilled in the art that changes may be made in the details thereof without departing from the scope as comprehended by the following claims.

I claim:

1. A rotary record filing device comprising a supporting stand and an annular platform mounted for rotation thereon in a horizontal plane, a plurality of circumferentially spaced rollers carried on horizontal axes by said stand below and rotatably supporting said platform, at least one of said rollers being driven and yieldably urged into frictional engagement with the platform, and a plurality of circumferentially spaced locating idler rollers carried on vertical axes by said stand and in frictional engagement with the inner periphery of said platform.

2. A rotary record filing device comprising a supporting stand and a plurality of concentric annular platforms mounted for rotation thereon in a horizontal plane, separate series of rollers carried by said stand disposed below and rotatably supporting each of said platforms, at least one roller of each series being driven and yieldably urged into frictional engagement with a platform bottom, and separate series of locating idler rollers in frictional engagement with the inner periphery of each platform carried by said stand.

3. A rotary record filing device comprising a supporting stand and a plurality of concentric annular platforms mounted for rotation thereon in a horizontal plane, separate series of rollers mounted on horizontally disposed axes carried by said stand disposed below and rotatably supporting each of said platforms for separate rotation, means supporting at least one roller of each of said series in yieldingly urged frictional engagement with a platform bottom, means for selectively driving said yieldably urged rollers in either direction, and separate series of locating idler rollers mounted on vertically disposed axes carried by said stand in frictional engagement with the inner periphery of each of said platforms.

4. A rotary record filing device comprising a supporting stand and a plurality of concentric annular platforms mounted for rotation thereon in a horizontal plane, separate series of rollers mounted on horizontally disposed axes carried by said stand disposed below and rotatably supporting each of said platforms for separate rotation, means supporting at least one roller of each of said series in yieldingly urged frictional engagement with a platform bottom, means for selectively driving said yieldably urged rollers, and separate series of at least three equi-angularly spaced locating idler rollers mounted on vertically disposed axes carried by said stand in frictional engagement with the inner periphery of each of said platforms.

5. A rotary record filing device comprising a supporting stand and a plurality of individually rotatable annular platforms mounted for rotation thereon in substantially a common horizontal plane, separate series of circumferentially spaced rollers carried on horizontal axes by said stand disposed below and rotatably supporting each of said platforms, each series of rollers inwardly from the outermost series being spaced a slight distance upwardly from the next outer series, and separate series of circumferentially spaced rollers for each of said platforms carried on vertical axes by said stand, each of the latter rollers being of short vertical dimension and frictionally engaging the exposed margin of the inner periphery of the respective one of said platforms.

6. A rotary record filing device comprising a supporting stand and an annular platform mounted for rotation thereon in a horizontal plane, and friction roller drive means for said platform comprising a frame pivotally mounted on a horizontal axis on said stand below said platform, a friction drive roller rotatably mounted on a horizontal axis on said frame to one side of and with its periphery above said pivot axis and exposed for engagement with the bottom of the platform, and drive means for said roller mounted on said frame below the upper extremity of said roller and projecting to the opposite side of said pivot axis, whereby said drive means tends to swing downwardly about said pivot axis and thereby yieldably urges the periphery of said roller upwardly into engagement with the bottom of said platform.

References Cited in the file of this patent

UNITED STATES PATENTS

| | | |
|---|---|---|
| 668,522 | Jolly | Feb. 19, 1901 |
| 1,965,850 | Melton | July 10, 1934 |
| 2,082,236 | Anderson | July 1, 1937 |
| 2,447,072 | Jones | Aug. 17, 1948 |
| 2,631,909 | Williams | Mar. 17, 1953 |
| 2,830,862 | Wright | Apr. 15, 1958 |
| 2,890,088 | Lenry | June 9, 1959 |
| 2,902,175 | Shoffner | Sept. 1, 1959 |
| 2,970,874 | Huneycutt et al. | Feb. 7, 1961 |